(12) United States Patent
Tian et al.

(10) Patent No.: US 10,710,696 B2
(45) Date of Patent: Jul. 14, 2020

(54) UNMANNED AERIAL VEHICLE WITH LINKAGE FOLDABLE ARMS

(71) Applicant: Haoxiang Electric Energy (Kunshan) Co., Ltd., Kunshan, Jiangsu (CN)

(72) Inventors: Yu Tian, Jiangsu (CN); Wenyan Jiang, Jiangsu (CN)

(73) Assignee: Haoxiang Electric Energy (Kunshan) Co., Ltd., Kunshan, Jiangsu (CN)

( * ) Notice: Subject to any disclaimer, the term of this patent is extended or adjusted under 35 U.S.C. 154(b) by 320 days.

(21) Appl. No.: 15/853,718

(22) Filed: Dec. 23, 2017

(65) Prior Publication Data

US 2018/0208291 A1    Jul. 26, 2018

(30) Foreign Application Priority Data

Dec. 28, 2016 (CN) .......................... 2016 1 1236229

(51) Int. Cl.
| | | |
|---|---|---|
| *B64C 1/06* | (2006.01) | |
| *B64C 27/50* | (2006.01) | |
| *B64C 39/02* | (2006.01) | |

(52) U.S. Cl.
CPC .............. *B64C 1/063* (2013.01); *B64C 27/50* (2013.01); *B64C 39/024* (2013.01); *B64C 2201/027* (2013.01); *B64C 2201/108* (2013.01)

(58) Field of Classification Search
CPC ....... B64C 1/063; B64C 27/50; B64C 39/024; B64C 2201/108; B64C 2201/027
See application file for complete search history.

(56) References Cited

U.S. PATENT DOCUMENTS

| | | | | |
|---|---|---|---|---|
| 2015/0321755 | A1* | 11/2015 | Martin | .................... B64C 27/50 244/17.23 |
| 2017/0305537 | A1* | 10/2017 | Smith | .................. G05D 1/0094 |
| 2017/0309088 | A1* | 10/2017 | Arya | .................. H04L 43/0811 |
| 2017/0313400 | A1* | 11/2017 | Zhydanov | ............... B64C 1/063 |
| 2018/0075834 | A1* | 3/2018 | Fong | ......................... H04R 3/04 |
| 2019/0084673 | A1* | 3/2019 | Chen | ........................ B64C 3/56 |
| 2019/0291864 | A1* | 9/2019 | Liu | ........................ B64D 47/08 |

FOREIGN PATENT DOCUMENTS

EP                2233393 A2 *   3/2010     .............. B64C 1/30

* cited by examiner

*Primary Examiner* — Brian M O'Hara
*Assistant Examiner* — Keith L Dixon

(57) ABSTRACT

The present invention relates to the technical field of UAV (unmanned aerial vehicle), and more particularly to a UAV with linkage foldable arms, which includes a linkage mechanism, a fuselage body and multiple aircraft arms. The multiple aircraft arms are connected with each other through the linkage mechanism and are connected with the fuselage body; a locating part is located in a middle of the fuselage body; the locating part comprises a positioning structure, a fixed structure which plays a limit role is located on one of the multiple aircraft arms, the fixed structure is buckled with the positioning structure. When the aircraft arms are unfolded or folded, only one aircraft arm needs to be operated to drive other aircraft arms to move under the action of the linkage mechanism, so that multiple folding steps are simplified into a folding process, which is convenient in operation and strong in practicability.

7 Claims, 7 Drawing Sheets

UNMANNED AERIAL VEHICLE WITH LINKAGE FOLDABLE ARMS

CROSS REFERENCE OF RELATED APPLICATION

The present invention claims priority under 35 U.S.C. 119(a-d) to CN 201611236229.0, filed Dec. 28, 2016.

BACKGROUND OF THE PRESENT INVENTION

Field of Invention

The present invention relates to a technical field of UAV (unmanned aerial vehicle), and more particularly to an unmanned aerial vehicle with linkage foldable arms.

Description of Related Arts

UAVs are unmanned aerial vehicles operated by radio remote control devices and their own program control devices, and are widely used in many fields such as military, agriculture, forestry, petroleum, electric power and environmental protection. At present, the domestic UAV market is hot, and the UAVs have been gradually expanded from the initial military field to the consumption field. The recognition and demand of UAVs by the general public are also gradually rising.

The hot sale of UAVs also contributed to the continuous improvement of the structure thereof by the relevant technical staff. Since the size of the fuselage and the aircraft arm of the previous UAVs are not easy to be changed, a power device and a propeller which are beyond the fuselage structure are mounted to the aircraft arm, which undoubtedly affects the carrying and storage of UAVs. Therefore, the folding of the aircraft arm of the UAV is a popular research and development direction in the current UAV field. At present, a lot of rotorcraft UAV products whose aircraft arms are foldable can be seen on the market. In order to reduce the space size of the UAV during storage, most of the existing foldable UAVs make the aircraft arms foldable; and however, every aircraft arm is folded individually, that is, if one user needs to be folded or unfolded all the aircraft arms of the UAV, the folding process needs to be separately performed for each aircraft arm, which is complicated in operation and inconvenient to use.

SUMMARY OF THE PRESENT INVENTION

An object of the present invention is to provide a UAV (unmanned aerial vehicle) with linkage foldable arms, which is able to effectively solve the problem that the existing UAVs are inconvenient to be folded and carried.

To solve the above technical problem, the present invention provides technical solutions as follows.

A UAV (unmanned aerial vehicle) with linkage foldable arms, comprises a linkage mechanism, a fuselage body and multiple aircraft arms, wherein the multiple aircraft arms are connected with each other through the linkage mechanism and are connected with the fuselage body, a locating part is located in a middle of the fuselage body, the locating part comprises a positioning structure, a fixed structure which plays a limit role is located on one of the multiple aircraft arms, the fixed structure is buckled with the positioning structure.

Preferably, multiple gears are respectively fixed to the aircraft arms, and the gears are engaged with each other to form the linkage mechanism.

Preferably, the positioning structure comprises two positioning convex heads, the fixed structure has a groove, the groove is engaged with the positioning convex heads.

Preferably, the multiple aircraft arms comprises one active aircraft arm and multiple passive aircraft arms, the active aircraft arm is a limit aircraft arm having the groove, the groove is provided at a joint of a shaft and the fuselage body on the limit aircraft arm, the active aircraft arm drives the passive aircraft arms to be folded through the linkage mechanism.

Preferably, when the limit aircraft arm rotates, the passive aircraft arms are driven to rotate; a rotation direction of the limit aircraft arm is opposite to a rotation direction of adjacent passive aircraft arms and is as same as a rotation direction of a passive aircraft arm which is opposite to the limit aircraft arm.

Preferably, the locating part comprises a limit rib and a limit elastic sheet, the limit rib is located in the middle of the fuselage body, the limit elastic sheet is fixed on the limit rib, the limit elastic sheet comprises a deformation cantilever, the deformation cantilever comprises two positioning structures respectively located at two ends of the deformation cantilever, the positioning structure faces towards a connection direction with one aircraft arm and is engaged with the fixed structure on the aircraft arm.

Preferably, the fuselage body has multiple shaft holes around the locating part, the aircraft arms are respectively inserted into the shaft holes for fixing.

Preferably, one shaft is located at one end of an aircraft arm, the other end of the aircraft arm extends outwardly and is fixed with a blade component.

Preferably, one end of the shaft is inserted into one of the shaft holes in the fuselage body for fixing, the other end of the shaft which is far away from a joint of the shaft and the fuselage body has screw holes, the linkage mechanism is limited and fixed to one of the aircraft arms through the screws via the screw holes.

Through the above technical solutions, compared with the prior art, the present invention has advantages and beneficially effects as follows.

Through the engagement of the locating part on the fuselage body and the fixed structure on one of the aircraft arms, a linkage aircraft arm structure which utilizes the limit aircraft arm to drive is formed. When the aircraft arms are folded or unfolded, only one limit aircraft arm needs to be operated, other aircraft arms are driven to move under the action of the gears, so that multiple folding steps are simplified to one folding process, which effectively simplifies the folding and unfolding action of all the aircraft arms, is convenient in operation and strong in practicability.

Figure 1:
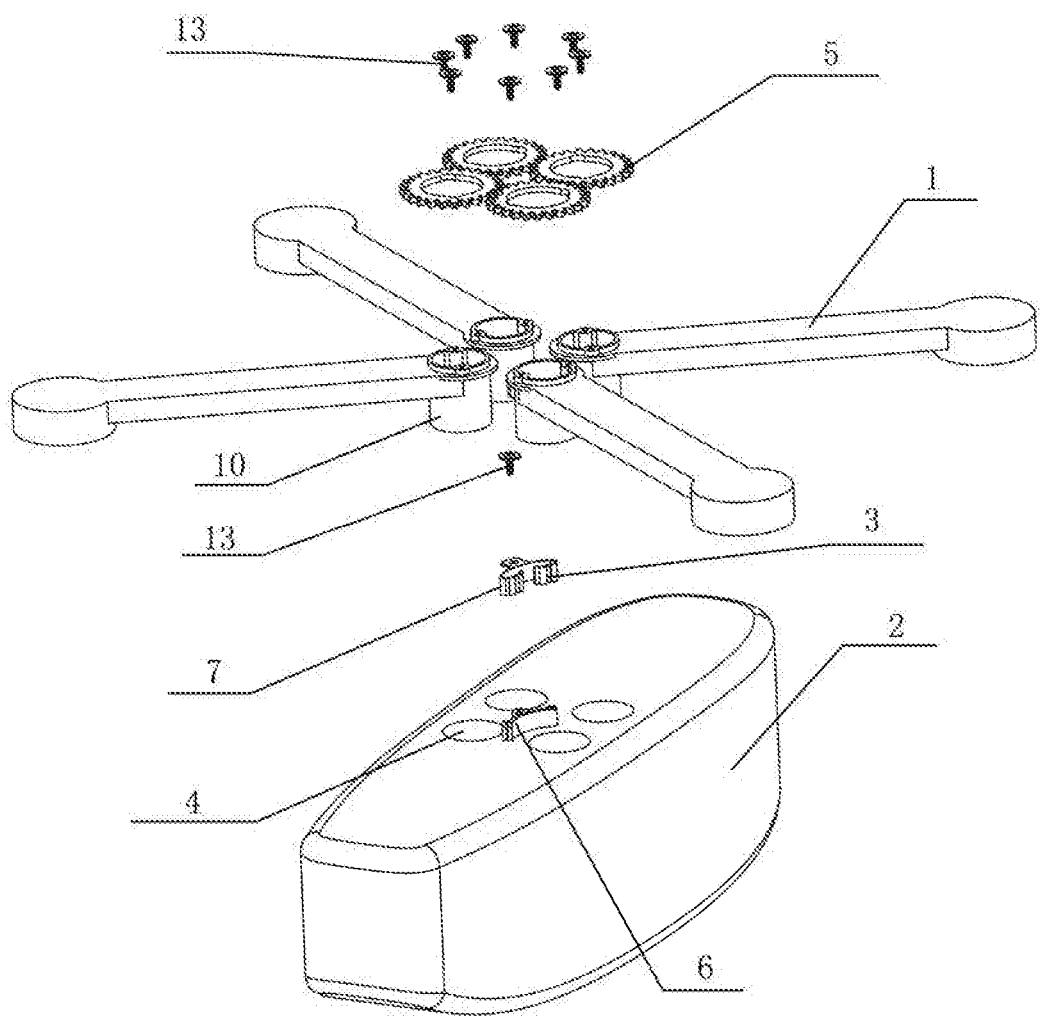
FIG. 1 is a structurally schematic diagram of a UAV (unmanned aerial vehicle) with linkage foldable arms according to a preferred embodiment of the present invention.
Figure 2:
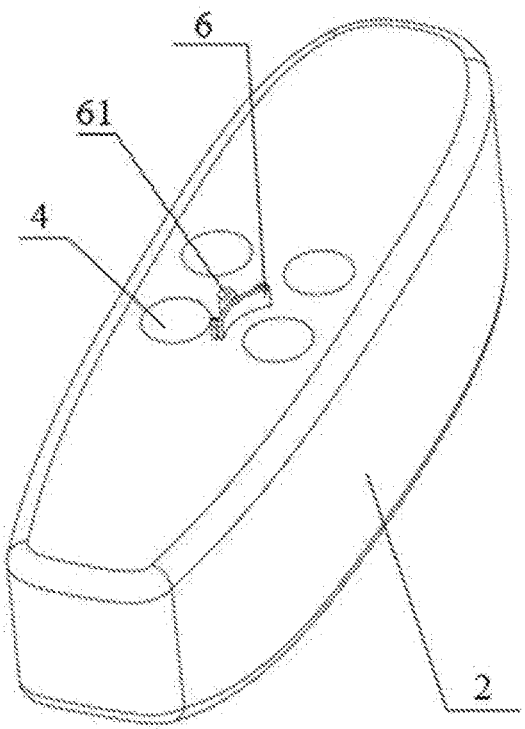
FIG. 2 is a structurally schematic diagram of a fuselage body of the UAV according to the preferred embodiment of the present invention.

In the drawings, 1: aircraft arm; 1-1: active aircraft arm; 1-2: passive aircraft arm; 2: fuselage body; 3: positioning convex head; 4: shaft hole; 5: linkage mechanism; 5-1: gear; 6: limit rib; 7: limit elastic sheet; 8: groove; 9: deformation cantilever; 10: shaft; 11: blade component; 12: screw hole; 13: screw; 20: locating part; 21: positioning structure; 30: fixed structure; 61: screw column.

DETAILED DESCRIPTION OF THE PREFERRED EMBODIMENT

The technical solution proposed by the present invention is further explained in detail with accompanying drawings and embodiments as follows. Through the following description and the claims, advantages and characteristics of the present invention are clearer. It should be noted that the drawings are in a very simplified form and use an inaccurate rate, which are only for conveniently and clearly assisting in the explanation of the objects of the present invention.

The present invention provides a UAV (unmanned aerial vehicle) with linkage foldable arms. When the aircraft arms are unfolded or folded, only one aircraft arm needs to be operated, other aircraft arms follows the action of the former aircraft, so that the folding action of all the aircraft arms is simplified.

Referring to FIG. 1, a UAV (unmanned aerial vehicle) according to the preferred embodiment of the present invention is illustrated, which comprises a linkage mechanism 5, a fuselage body 2 and multiple aircraft arms 1, wherein the multiple aircraft arms 1 are connected with each other through the linkage mechanism 5, and are connected with the fuselage body 2. A locating part 20 is located in a middle of the fuselage body 2, the locating part 20 comprises a positioning structure 21. A fixed structure 30 which plays a limit role is located on one of the multiple aircraft arms 1. The fixed structure 30 is engaged with the positioning structure 21. In the preferred embodiment of the present invention, the positioning structure 21 comprises two positioning convex heads 3, the fixed structure 30 has a groove 8, the groove 8 is correspondingly engaged with the positioning convex head 3, so that the limit function between the aircraft arms 1 and the fuselage body 2 is achieved.

In the present invention, the linkage mechanism 5 comprises multiple gears 5-1 which are respectively fixed on the aircraft arms 1 and are engaged with each other.

Figure 3:
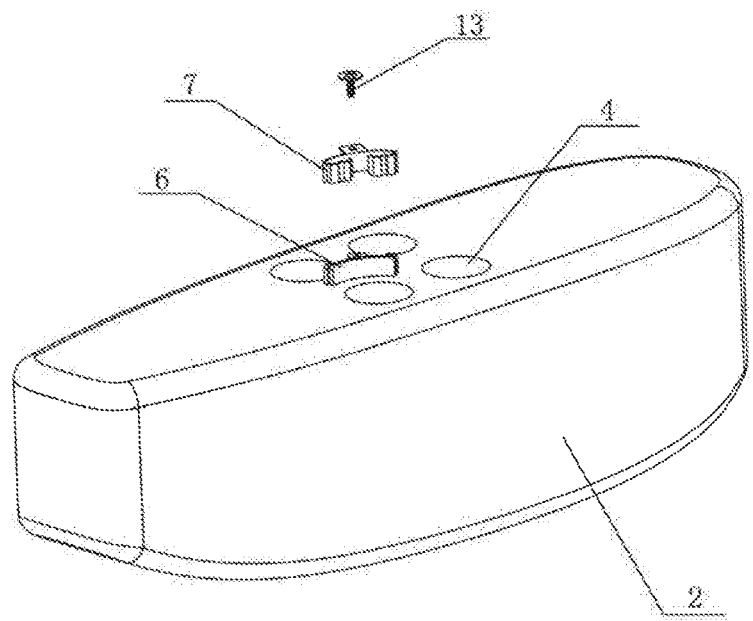
FIG. 3 is an installation diagram of a locating part and the fuselage body according to the preferred embodiment of the present invention.
Figure 4:
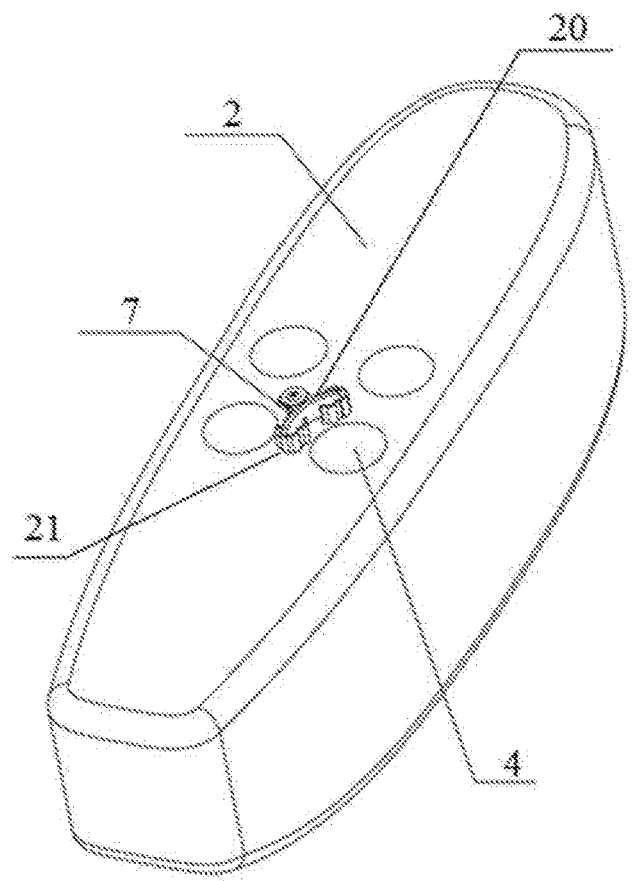
FIG. 4 shows that the locating part and the fuselage body are installed completely according to the preferred embodiment of the present invention.
Figure 5:
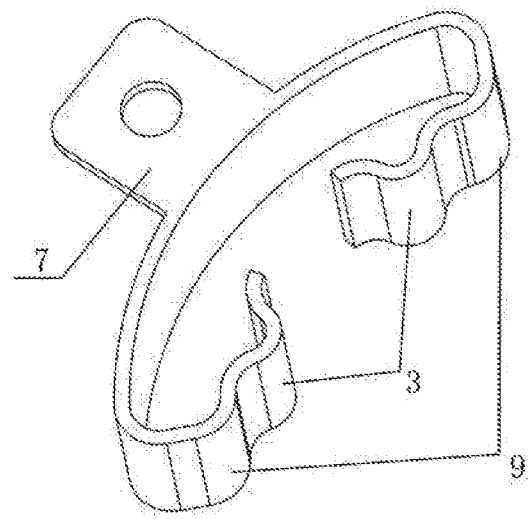
FIG. 5 is a structurally schematic diagram of a limit elastic sheet according to the preferred embodiment of the present invention.

The locating part 20 comprises a limit rib 6 and a limit elastic sheet 7, wherein the limit rib 6 is located in the middle of the fuselage body 2 for fixing the limit elastic sheet 7. The limit rib 6 comprises a screw column 61. The limit elastic sheet 7 is fixed to the limit rib 6 through the screw column 61 via a screw 13, such that the fuselage body 2 and the locating part 20 which is defined by the limit rib 6 and the limit elastic sheet 7 limit the aircraft arms to rotate together. FIGS. 3 and 4 show the installation between the locating part 20 and the fuselage body 2. The limit elastic sheet 7 comprises a wavy deformation cantilever 9, as shown in FIG. 5, wherein the deformation cantilever 9 comprises two positioning convex heads 3 respectively located at two ends thereof.

Figure 6:
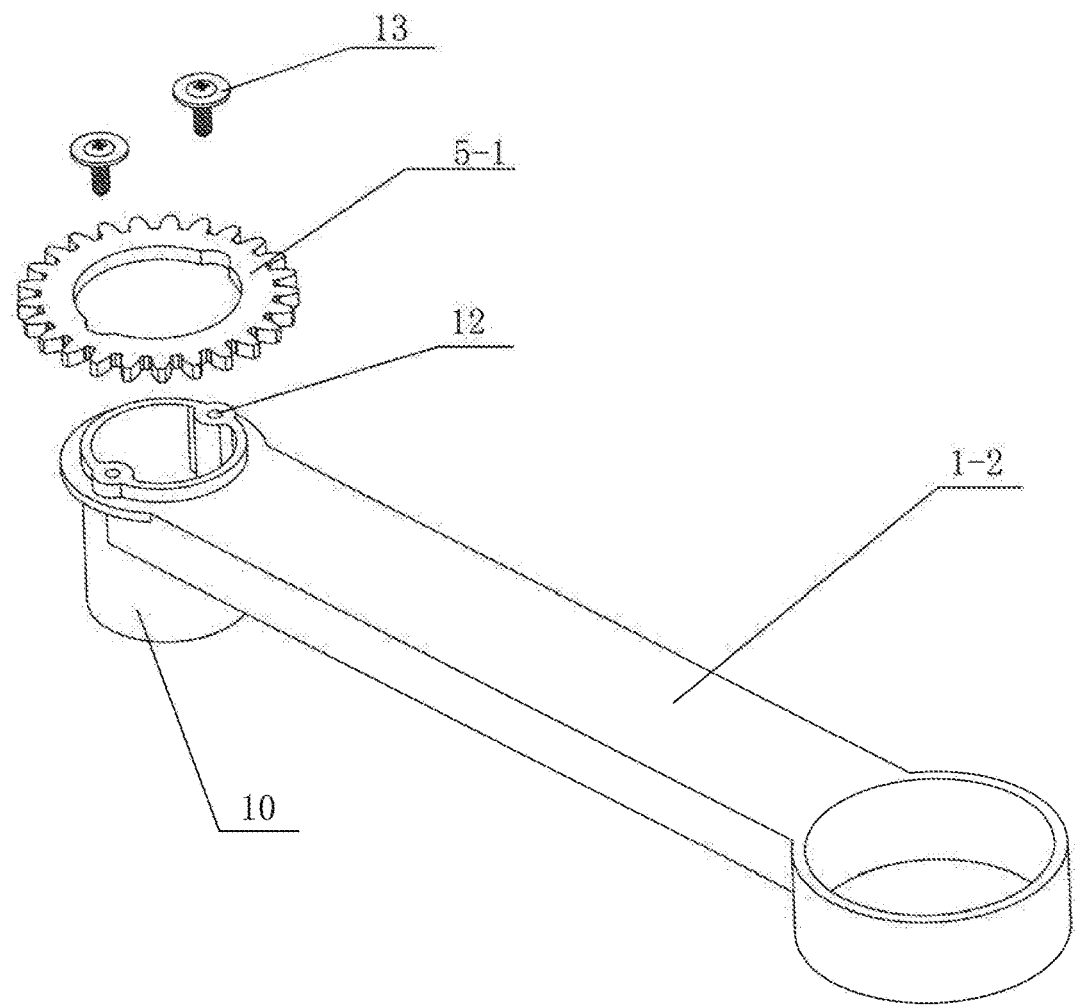
FIG. 6 is a connection diagram of aircraft arms and gears according to the preferred embodiment of the present invention.

In the present invention, a shaft 10 is located at one end of every aircraft arm 1 of the UAV, the other end of the aircraft arm 1 extends outwardly and is fixed with a blade component 11; one end of every shaft 10 is inserted into a shaft hole 4 in the fuselage body 2 for fixing, the other end of every shaft 10 which is far away from a joint of the shaft 10 and the fuselage body 2 has screw holes 12; the screws 13 respectively passes through the screw holes 12 for limiting and fixing the gear 5-1 to the aircraft arm 1. FIG. 6 shows the connection between the gear 5-1 and the aircraft arm 1.

Figure 7:
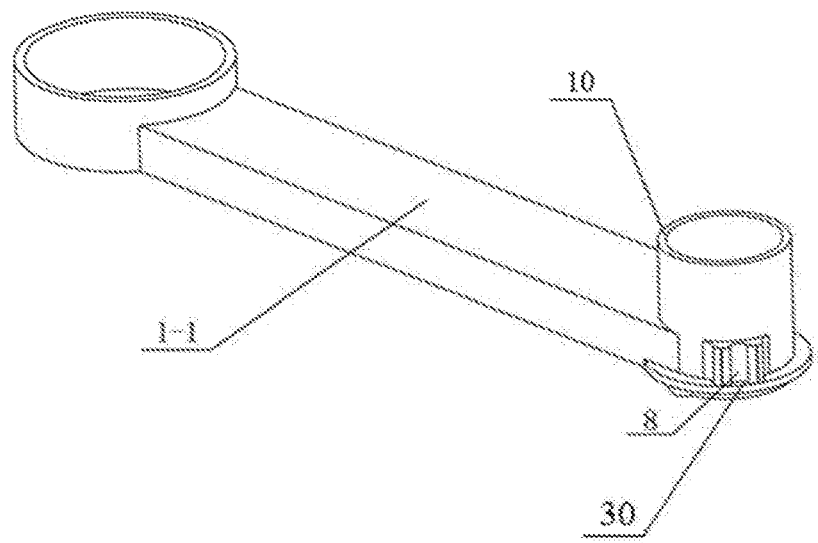
FIG. 7 is a structurally schematic diagram of an active aircraft arm according to the preferred embodiment of the present invention.

The aircraft arms 1 of the present invention are divided into two categories: an active aircraft arm 1-1 and passive aircraft arms 1-2, wherein the active aircraft arm 1-1 is a limit aircraft arm having a groove 8, and the others are the passive aircraft arms 1-2. FIG. 7 is a structurally schematic diagram of the active aircraft arm 1-1. The limit aircraft arm has the groove 8 which is provided at the joint of the shaft 10 and the fuselage body 2. Due to the positioning convex heads 3 face towards a connection direction of one aircraft arm 1 therewith, when the aircraft arms 1 are installed, the groove 8 is engaged with one positioning convex head 3 of the limit elastic sheet 7; every gear 5-1 is fixed to every aircraft arm 1, all gears 5-1 are engaged with each other to form the linkage mechanism 5, such that the limit aircraft arm acts as the active aircraft arm 1-1 of the UAV for driving other passive aircraft arms 1-2 to be folded through all the gears 5-1. Since all the gears 5-1 are engaged with each other, the active aircraft arm 1-1 rotates to drive the passive aircraft arms 1-2 to act; a rotation direction of the active aircraft arm 1-1 is opposite to a rotation direction of adjacent passive aircraft arms 1-2, and is as same as a rotation direction of a passive aircraft arm 1-2 which is opposite to the limit aircraft arm.

Figure 8:
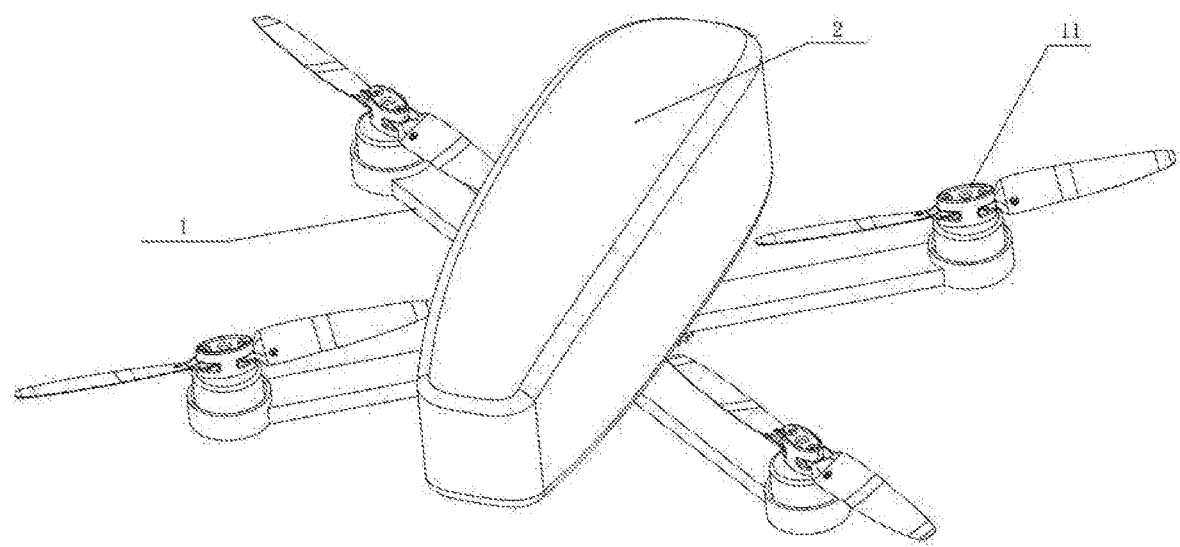
FIG. 8 is a top view of an unfolded UAV according to the preferred embodiment of the present invention.
Figure 9:
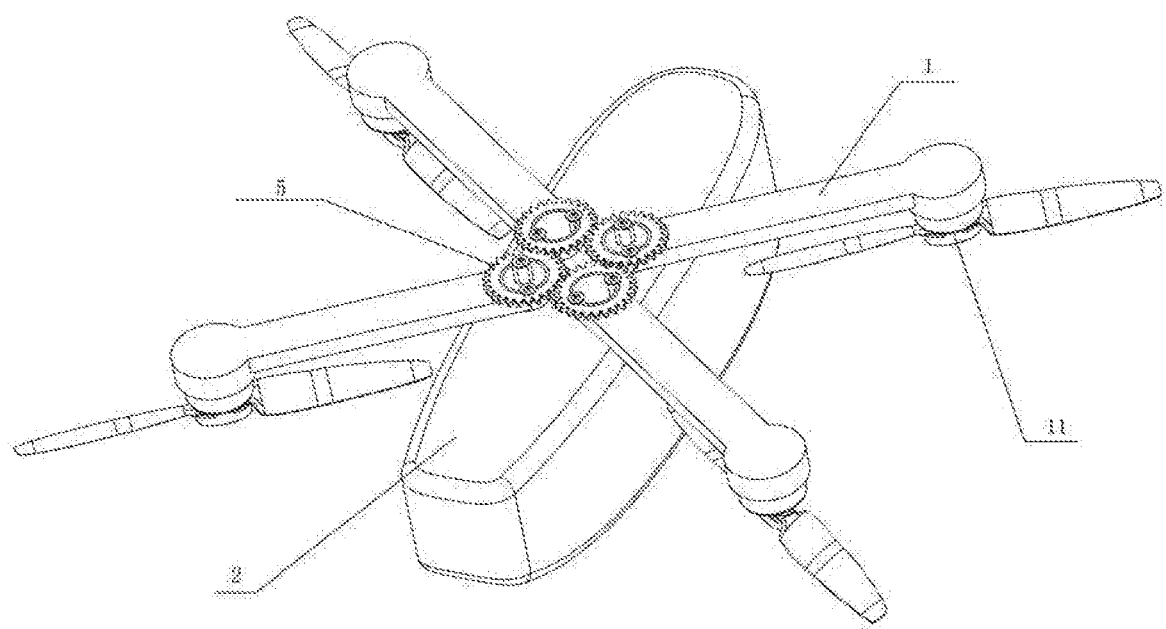
FIG. 9 is a bottom view of the unfolded UAV according to the preferred embodiment of the present invention.
Figure 10:
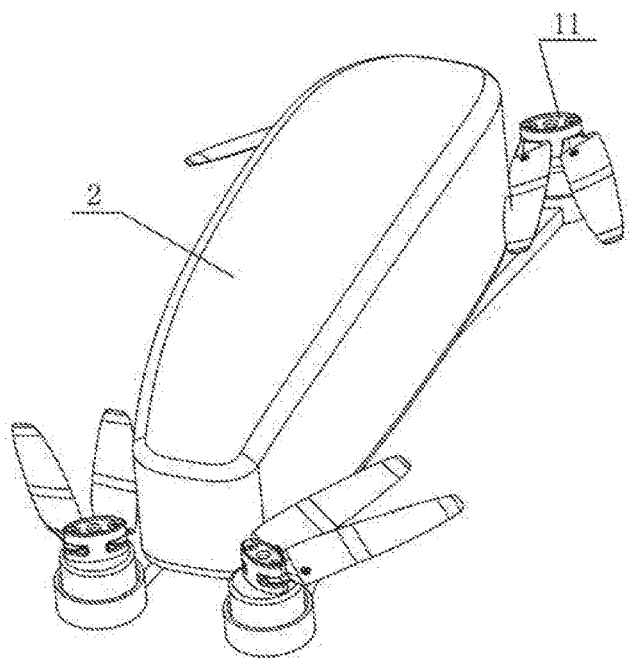
FIG. 10 is a top view of a folded UAV according to the preferred embodiment of the present invention.
Figure 11:
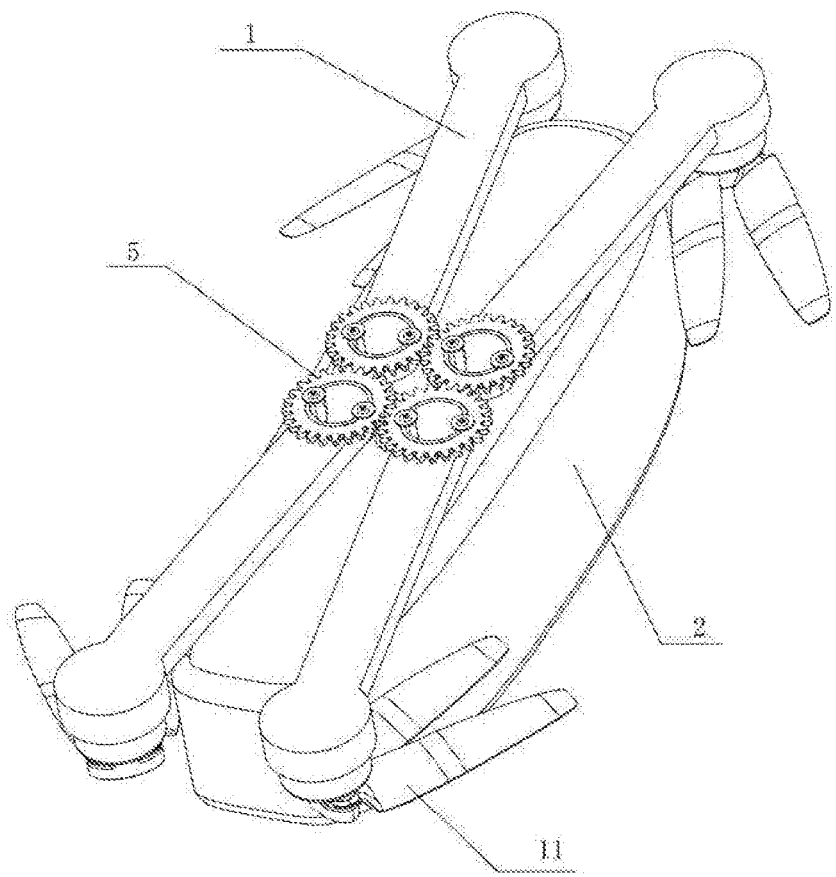
FIG. 11 is a bottom view of the folded UAV according to the preferred embodiment of the present invention.

In the drawings of the present invention, the UAV comprises four aircraft arms 1 which are divided into one active aircraft arm 1-1 (namely, limit aircraft arm) and three passive aircraft arms 1-2. FIGS. 8 and 9 are schematic views of the unfolded UAV. Every aircraft arm 1 is fixedly connected with one gear 5-1, all the gears 5-1 are engaged with each other, such that only the active aircraft arm 1-1 needs to be operated so as to drive the three passive aircraft arms 1-2 to act. FIGS. 10 and 11 are schematic views of the folded UAV.

When the UAV of the present invention is installed, the limit elastic sheet 7 is firstly installed to the fuselage body 2 of the UAV and limited by the limit rib 6, and then is fixed to the fuselage body 2 by the screws 13; thereafter, the gears 5-1 are respectively installed to the aircraft arms 1; shafts 10 corresponding to the passive aircraft arms 1-2 are respectively directly inserted to the aircraft holes 4 to complete an installation of the passive aircraft arms 1-2; a shaft 10 corresponding to the active aircraft arm 1-2 is inserted into one aircraft hole 4, the groove 8 on the active aircraft arm 1-1 is engaged with the positioning convex heads 3, so as to complete an installation of the active aircraft arm 1-1. After completing the installation of all the aircraft arms, four gears 5-1 are engaged with each other to rotate the active aircraft arm 1-1, if the active aircraft arm 1-1 rotates clockwise, then adjacent two passive aircraft arms 1-2 rotates counterclockwise and a passive aircraft arm 1-2 which is opposite to the active aircraft arm 1-1 rotates clockwise; if the active aircraft arm 1-1 rotates counterclockwise, then other passive aircraft arms 1-2 are correspondingly changed.

Figure 12:
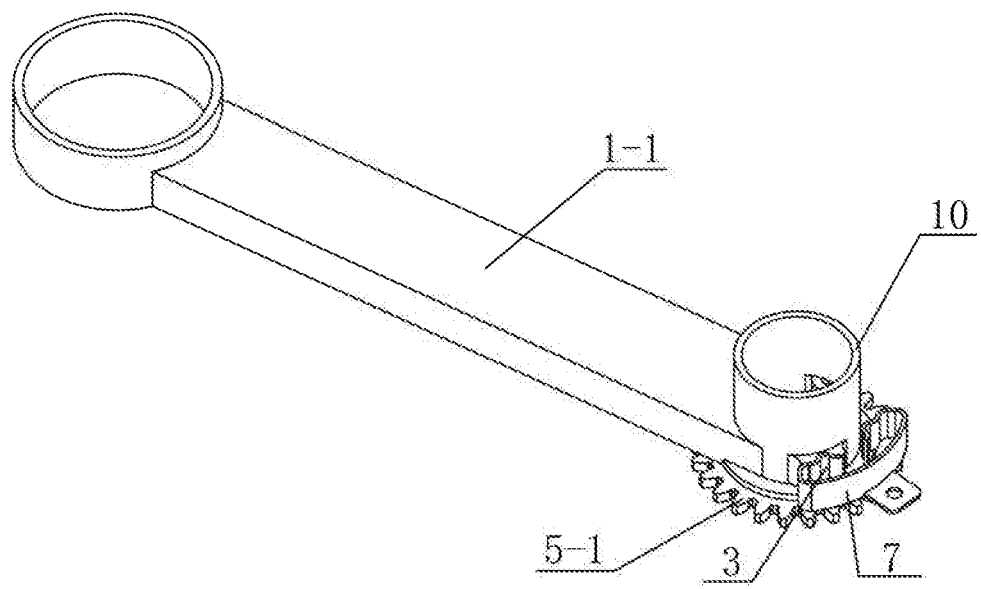
FIG. 12 shows a positional relationship between the limit aircraft arm and one gear when the UAV is unfolded according to the preferred embodiment of the present invention.
Figure 13:
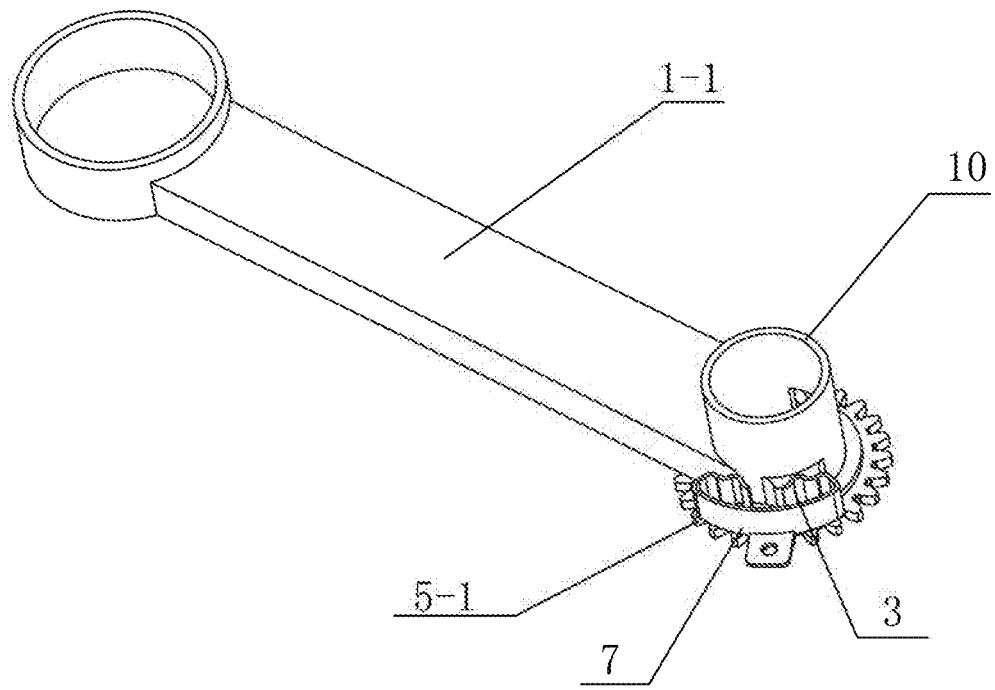
FIG. 13 shows a positional relationship between the limit aircraft arm and one gear when the UAV is folded according to the preferred embodiment of the present invention.

The folded state and the unfolded state of the fuselage arms 1 are ensured through the limit role between the active aircraft arm 1-1 and the limit elastic sheet 7. The transmission among the aircraft arms of the UAV is achieved through the gears 5-1, and the active aircraft arm 1-1 is engaged with the limit elastic sheet 7, which is convenient for switching between the folded state and the unfolded state of the UAV. When the aircraft arms of the UAV are unfolded, the groove 8 on the active aircraft arm 1-1 is engaged with one positioning convex head 3 of the limit elastic sheet 7, as shown in FIG. 12; when the active aircraft arm 1-1 rotates, the gear 5-1 on the active aircraft arm 1-1 rotates, the active aircraft arm 1-1 drives other passive aircraft arms 1-2 to be folded under the transmission action of the linkage mechanism 5, the groove 8 on the active aircraft arm 1-1 is engaged with the other positioning convex head 3 of the limit elastic sheet 7, the aircraft arms of the UAV are switched to the folded state, as shown in FIG. 13. When the UAV is switched from the folded state to the unfolded state, the principle is the same as above.

Obviously, those skilled in the art can make various modifications and variations to the present invention without departing from the spirit and scope of the present invention. Therefore, if these modifications and variations of the present invention fall within the scope of the claims of the present invention and its equivalent technologies, the present invention is also intended to include these modifications and variations.

What is claimed is:

1. A UAV (unmanned aerial vehicle) with linkage foldable arms, comprising a linkage mechanism, a fuselage body and multiple aircraft arms wherein:
   the multiple aircraft arms are connected with each other through the linkage mechanism and are connected with the fuselage body, a locating part is located in a middle of the fuselage body, the locating part comprises a positioning structure, a fixed structure which plays a limit role is located on one of the multiple aircraft arms, the fixed structure is buckled with the positioning structure;
   the positioning structure comprises two positioning convex heads, the fixed structure has a groove, and the groove is engaged with the positioning convex heads.

2. The UAV with the linkage foldable arms, as recited in claim 1, wherein the multiple aircraft arms comprises one active aircraft arm and multiple passive aircraft arms, the active aircraft arm is a limit aircraft arm having the groove, the groove is provided at a joint of a shaft and the fuselage body on the limit aircraft arm, the active aircraft arm drives the passive aircraft arms to be folded through the linkage mechanism.

3. The UAV with the linkage foldable arms, as recited in claim 2, wherein when the limit aircraft arm rotates, the passive aircraft arms are correspondingly driven to rotate, a rotation direction of the limit aircraft arm is opposite to a rotation direction of adjacent passive aircraft arms and is as same as a rotation direction of a passive aircraft arm which is opposite to the limit aircraft arm.

4. A UAV (unmanned aerial vehicle) with linkage foldable arms, comprising a linkage mechanism, a fuselage body and multiple aircraft arms wherein:
   the multiple aircraft arms are connected with each other through the linkage mechanism and are connected with the fuselage body, a locating part is located in a middle of the fuselage body, the locating part comprises a positioning structure, a fixed structure which plays a limit role is located on one of the multiple aircraft arms, the fixed structure is buckled with the positioning structure;
   the locating part comprises a limit rib and a limit elastic sheet, the limit rib is located in the middle of the fuselage body, the limit elastic sheet is fixed on the limit rib, the limit elastic sheet comprises a deformation cantilever, the deformation cantilever comprises the positioning structure, the positioning structure comprises two positioning convex heads respectively located at two ends of the deformation cantilever, the positioning convex heads face toward a connection direction with the aircraft arms and are engaged with the fixed structure on one aircraft arm.

5. The UAV with the linkage foldable arms, as recited in claim 4, wherein the fuselage body has multiple shaft holes around the locating part, the aircraft arms are respectively inserted into the shaft holes for fixing.

6. The UAV with the linkage foldable arms, as recited in claim 5, wherein one shaft is located at one end of every aircraft arm, the other end of every aircraft arm extends outwardly and is fixed with a blade component.

7. The UAV with the linkage foldable arms, as recited in claim 6, wherein one end of every shaft is inserted into one shaft hole of the fuselage body for fixing, the other end of every shaft which is away from a joint of the shaft and the fuselage body has screw holes, the linkage mechanism is limited and fixed to the aircraft arms through the screws via the screw holes.

* * * * *